Dec. 26, 1967  A. E. FARR ET AL  3,360,088
AUTO RELEASE THROTTLE FRICTION CLUTCH
Filed Oct. 24, 1965
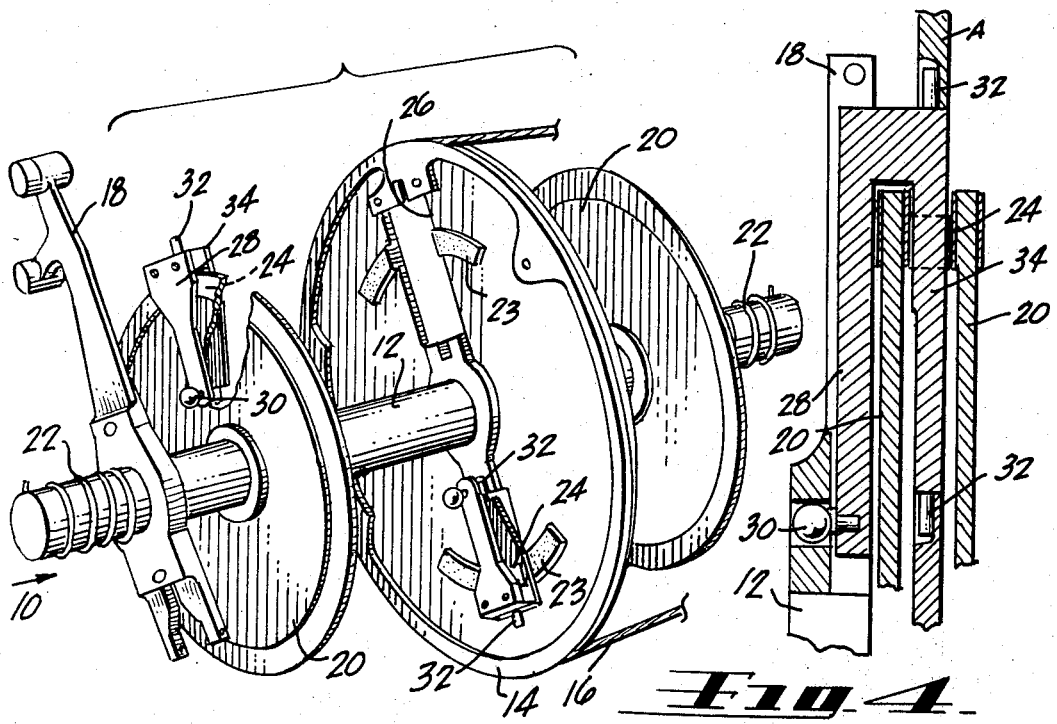
Fig. 1
Fig. 4
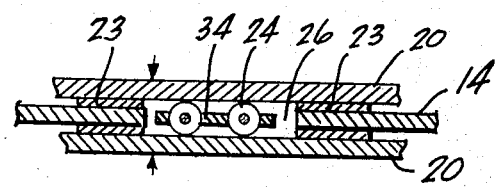
Fig. 2
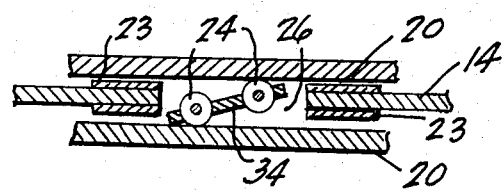
Fig. 3
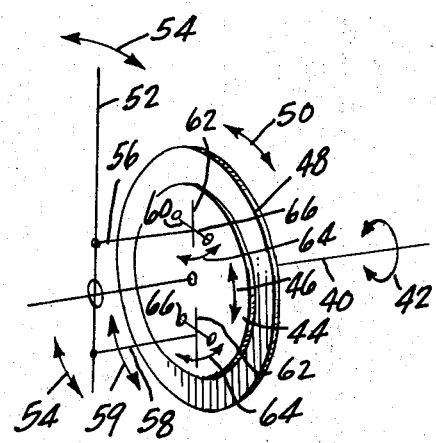
Fig. 5
INVENTORS
ALTON E. FARR
CLARENCE W. NEHER
BY Robert O.
Richardson
-ATTORNEY-

United States Patent Office 3,360,088
Patented Dec. 26, 1967

3,360,088
AUTO RELEASE THROTTLE FRICTION CLUTCH
Alton E. Farr, Rolling Hills, and Clarence W. Neher, Long Beach, Calif., assignors, by mesne assignments, to McDonnell Douglas Corporation, Santa Monica, Calif., a corporation of Maryland
Filed Oct. 24, 1965, Ser. No. 504,960
7 Claims. (Cl. 192—66)

ABSTRACT OF THE DISCLOSURE

An auto release friction clutch is used with a plurality of controls which may be operated collectively by a single servo shaft and wherein individual throttle controls may be adjusted individually relative to the others. A manual over-ride crank disengages the throttle control from the servo shaft and permits relative rotation thereof for a new setting relative to the settings of the other controls when again re-engaged with the shaft for rotation therewith.

Background of the invention

In aircraft having a plurality of engines, it is desirable upon certain occasions to vary the power output of the engines simultaneously and on other occasions to increase or decrease the power output of each engine individually relative to the others. The power output of all engines would be simultaneously controlled again after their individual adjustment has ben made. There are existing devices which permit interchange from servo control over several devices to individual manual control over each device, although this is done with the use of different structure. One such device is described in Patent No. 2,881,635 for a Control Element which was issued Apr. 14, 1959 to Leonard M. Greene.

Summary of the invention

The present invention relates to an automatic release friction clutch for this purpose adapted for use with a servo driven throttle control for aircraft engines. Release of the servo drive from operating the throttle of a selected engine is effected with the friction clutch by manipulation of a release crank provided with opposed pairs of ball-bearings or rollers disposed between a pair of parallel disc-like friction surfaces. In the engaged position of the crank, the ball-bearing of roller pairs, mounted on a throttle control drum, lie in a plane parallel with the friction surfaces and in contact with both of them. As the friction surfaces are servo driven, the rollers provide a frictional drive coupling between the friction surfaces and the ball or roller support assembly which is fixed to the output drive. Actuation of the manual over-ride crank to affect disengagement of the clutch causes the roller or ball-bearing pairs to pivot from contact with both surfaces into a position where they contact individual friction surfaces. The roller elements are then free to rotate against their individual associated friction surfaces, thereby freeing the output drive from the friction surfaces and thus establishing manual control. The automatic releasing throttle friction clutch comprising the present invention includes a combination input and release crank with roller assembly, clutch plates, spring, shaft and output member. This clutch provides a feel of signal from the driven end back to the throttle handle and thus to the operator. This clutch is easy to operate by separating the clutch plates with roller bearings or balls when the pilot desires to over-ride the automatic throttle. In addition, it is believed that the structure utilizing the present invention is relatively simple, of low cost and is light in weight. Its unlocking force is independent of the output feed-back load, it contains an over-riding clutch for protection against a jammed throttle control system and it is not self-energizing. It does not require a high unlocking force and does not have a tendency to chatter with little or no output load.

It is an object of the present invention to provide for a control system in which the throttles of a multi-engine aircraft are under a common servo control yet which may be individually regulated by a manual control over-ride for any selected throttle, while leaving the remaining throttles under servo control.

Another object is the provision of a control system having a servo control for a plurality of throttles and wherein each throttle has a manual over-ride for individual throttle adjustment and wherein such over-ride is accomplished through a novel clutch mechanism.

Another object is the provision of a novel method of separating clutch plates from driving engagement with an actuating device whereby an individual manual adjustment may be made for driving one device while other devices remain under a servo control.

These and other objects will become more readily apparent from the following description having reference to the drawings, wherein:

Brief description of drawings

FIGURE 1 is an exploded perspective view illustrating one friction clutch with parts broken away, better to illustrate its operation, FIGURE 2 is a schematic illustration of the clutch plates with a cable drum in between, and wherein the contact rollers frictionally engage both plates thereby to maintain the friction plates and cable drum in relatively non-rotatable position, FIGURE 3 is a view similar to that of FIG. 2 wherein the manual operation of the throttle has caused rotation of the releasing crank and associated rollers, whereby the rollers contact individual clutch plates but not both, thereby to permit relative movement between the cable drum and the associated friction plates, FIGURE 4 is a sectional view taken through the input crank and release crank with roller assembly mounted on the cable drum between the clutch friction plates, and FIGURE 5 is a diagrammatic illustration of the movements of the various parts to illustrate more clearly their operation.

Description of present embodiment

Reference is now made to FIGURES 1 to 4 which show one of several similar mechanisms all adapted for mounting on a servo shaft. There is one such mechanism 10 for each of the several engines which are to be controlled by the rotation of the servo shaft 12 and which are also individually adjustable. Each of the mechanisms 10 controls an engine output which is accomplished by rotation by the cable drum 14 connected to the engines, not shown, by cables 16. Drum 14 is considered the output. The input may be in the form of rotation of the servo shaft 12 to rotate uniformly a plurality of such cable drums 14. The input also may consist of throttle handle 18 which is selectively and individually rotated by the pilot to adjust one of several engines.

Friction clutch plates 20, 20 are nonrotatably mounted on shaft 12 on the opposite sides of the cable drum 14. These plates are frictionally urged, such as by springs 22, against the cable drum 14 to urge its rotation with movement of shaft 12 and plates 20, 20. As shown in FIGURE 2, these plates are urged against friction pods 23 and against the roller bearings 24, 24 which ride in the plane of the drum 14 within an aperture 26 in the drum. As the servo shaft 12 rotates in one direction, the plates 20, 20 also rotate in that direction. Their pressure on pods 23 also causes drum 14 to rotate. In an alternative embodiment bearings 24 may be large enough that plates 20, 20 do not frictionally grip drum 14 directly but through the larger bearings 24. Because of the equal and opposite rotative force on the roller bearings 24 by the two plates 20, 20, the rollers do not rotate, and hence cable drum 14 follows the direction of rotation of the friction plates 20, 20. In both embodiments servo shaft 12 rotates all throttle control drums 14 that are mounted thereon, each actuating a separate engine.

The individual throttle adjustment is made by rotation of throttle handle 18, which causes rotation of input lever 28 in a manner to be later described. The result of this action causes the rollers 24 to rotate angularly out of the plane of the cable drum 14, as shown in FIGURE 3, so that each roller 24 is urged against only one of the friction plates 20. In this manner, there is no equal and opposite rotative force on the rollers and cable drum 14 then may be rotated relative to the plates 20, 20 by handle 18. Also the friction pods 23 no longer engage the friction plates 20 to be rotated thereby. When the throttle handle 18 is then no longer rotated, the input lever 28 no longer rotates the rollers into single plate contact, as in FIG. 3, and the lateral force of springs 22 on the plates 20, 20 causes the rollers 24 to resume their position again against both plates 20, 20 as shown in FIGURE 2.

The action of the input lever 28 may be more clearly understood with additional reference to FIGURE 4, which is a cross-sectional view of a portion thereof. Rotation of the throttle handle 18 about shaft 12 causes pivot pin 30 to rotate about shaft 12, also. This causes the input lever 28 to pivot about the pivot points 32, 32 on drum 14. These pivot points are axially spaced from the input lever 28. These pivot points 32 on the drum 14 impart rotational movement to drum 14 from movement of the throttle handle 18. This input lever 28, upon such rotation, causes the release crank 34 to pivot. Release crank 34 is identified as that structure that is pivotable between pivots 32, 32 when actuated by lever 28. Rollers 24 mounted on release crank 34 move from their position shown in FIGURE 2 to their position shown in FIGURE 3. In this position the rollers urge clutch plates 20 apart, out of contact with drum pods 23, and each roller contacts only one plate, permitting drum 14 to rotate easily relative to the clutch plates 20 and servo shaft 12.

The actuation and action of the input crank is also shown in FIGURE 5. Here is illustrated the movement of the various structures about their axes of rotation. Here axis 40 represents the servo shaft that rotates in either direction as shown by double arrow 42. Upon its rotation, clutch plate 44 rotates in the direction of the arrow 46. Cable drum 48 also follows the arrow 50.

When the individual throttle handle 52 is the moving force, in the plane of arrow 54, crank arms 56 and 58, which are pivotally connected thereto, follow as shown by arrow 59. This causes a twisting movement of release crank 60 about axis 62 as shown by arrows 64. This twisting movement, in turn, causes a rotation of the rollers 66 about axis 62, as shown by the same arrows 64. This twisting movement separates the friction plates 44, permitting the cable drum 48 to be moved relative to the friction plates 44. When the moving force is the rotation of the servo shaft 40, which causes rotation in the direction of arrow 42, this twisting movement of arms 56, 58 does not occur, and the cable drum 48 and friction plates 44 move together.

The friction clutch just described may be manually operable under any selected force, depending upon the mechanical advantage desired. This selected mechanical advantage may be determined by the relationship of the length of the handle to the distance from the shaft to the pivot point of the input crank on the handle. Also the spacing along the shaft from this pivot point to the drum as compared to the spacing of the rollers on the release crank is a consideration. These measurements, considered with the spring tension, determine whether finger tip control or greater force is necessary in throttle handle adjustment.

While the foregoing description of a preferred embodiment has been made for purposes of illustrating the principles of this invention, it is to be understood that the invention is not limited thereto and that many modifications and variations will readily occur to those skilled in the art. It is to be understood that these deviations from the preferred embodiment just described are to be considered as part of the invention as defined by the following appended claims.

What is claimed is:
1. An auto release friction clutch comprising:
a shaft,
a control drum rotatably mounted on said shaft,
a clutch plate mounted on said shaft in nonrotatable position relative to said shaft,
means urging said plate against said drum for urging rotation of said drum with rotation of said shaft, and
release means for urging said plate out of contact with said drum and for independent rotation of said drum relative to said plate and shaft.

2. An auto release friction clutch comprising:
a servo shaft adapted to rotate in response to forces applied thereto,
a control drum rotatably mounted on said shaft,
a pair of clutch plates mounted on said shaft on opposite sides of said drum in nonrotatable position relative to said shaft,
means urging said plates against said drum for urging rotation of said drum with rotation of said plates, and
release means for urging said plates apart and out of contact with said drum for independent rotation of said drum relative to said plates and shaft.

3. An auto release friction clutch comprising:
a servo shaft adapted to rotate in response to forces applied thereto,
a control drum rotatably mounted on said shaft,
a pair of clutch plates slidably mounted on said shaft on opposite sides of said drum in nonrotatable position relative to said shaft,
means urging said plates against said drum for urging rotation of said drum with rotation of said plates, and
release means for urging said plates apart and out of contact with said drum and for independent rotation of said drum relative to said plates and shaft.

4. An auto release friction clutch comprising:
a servo shaft adapted to rotate in respones to forces applied thereto,
a control drum rotatably mounted on said shaft,
a pair of clutch plates slidably mounted on said shaft on opposite sides of said drum in nonrotatable position relative to said shaft,
means urging said plates against said drum for urging rotation of said drum with rotation of said plates, and
release means for urging said plates apart and out of contact with said drum and independent rotation of said drum relative to said plates and shaft,
said release means being pivotally mounted on said drum and having an actuating crank.

5. An auto release friction clutch comprising:
a servo shaft adapted to rotate in response to forces applied thereto,
a control drum rotatably mounted on said shaft,
a pair of clutch plates slidably mounted on said shaft on opposite sides of said drum in nonrotatable position relative to said shaft,
means urging said plates against said drum for urging rotation of said drum with rotation of said plates, release means for urging said plates apart and out of contact with said drum and independent rotation of said drum relative to said plates and shaft, said release means being pivotally mounted on said drum and having an actuating crank, and, a handle rotatably mounted on said shaft, said actuating crank being pivotally attached to said handle.

6. An auto release friction clutch comprising:

a servo shaft adapted to rotate in response to forces applied thereto, a control drum rotatably mounted on said shaft, a pair of clutch plates slidably mounted on said shaft on opposite sides of said drum in nonrotatable position relative to said shaft, means urging said plates against said drum for urging rotation of said drum with rotation of said plates, release means for urging said plates apart and out of contact with said drum and for independent rotation of said drum relative to said plates and shaft, said release means including spaced apart rollers engageable with both said plates from which nonrotatable forces are imparted thereon, said release means being pivotally mounted on said drum and having an actuating crank, a handle rotatably mounted on said shaft, said actuating crank being pivotally attached to said handle, said rollers contacting individual plates in rotatable position for relative movement between said drum and said plates upon actuation of said handle.

7. An auto release friction clutch comprising:

a servo shaft adapted to rotate in response to forces applied thereto, a control drum rotatably mounted on said shaft, a pair of clutch plates slidably mounted on said shaft on opposite sides of said drum in nonrotatable position relative to said shaft, means urging said plates in frictional contact with said drum for urging rotation of said drum with rotation of said plates, release means for permitting independent rotation of said drum relative to said plates and shaft, said release means being pivotally mounted on said drum and having an actuating crank, a handle rotatably mounted on said shaft, said actuating crank being pivotally attached to said handle.

References Cited

UNITED STATES PATENTS

| | | | |
|---|---|---|---|
| 2,394,384 | 2/1946 | Horstmann | 74—625 |
| 2,823,560 | 2/1958 | Harp et al. | 192—66 X |
| 3,181,389 | 5/1965 | Richard | 74—480 |
| 3,285,376 | 11/1966 | Starrantino | 192—.02 |

DONLEY J. STOCKING, *Primary Examiner.*

ARTHUR T. MC KEON, *Examiner.*